(12) United States Patent
Inoubli et al.

(10) Patent No.: US 10,513,603 B2
(45) Date of Patent: Dec. 24, 2019

(54) COMPOSITION COMPRISING A MULTISTAGE POLYMER, ITS METHOD OF PREPARATION AND ITS USE

(71) Applicant: Arkema France, Colombes (FR)

(72) Inventors: Raber Inoubli, Villeurbanne (FR); Philippe Hajji, Chatillon d' Azergues (FR); Rosangela Pirri, Montardon (FR)

(73) Assignee: Arkema France, Colombes (FR)

( * ) Notice: Subject to any disclaimer, the term of this patent is extended or adjusted under 35 U.S.C. 154(b) by 17 days.

(21) Appl. No.: 15/537,465

(22) PCT Filed: Dec. 23, 2015

(86) PCT No.: PCT/EP2015/081159
§ 371 (c)(1),
(2) Date: Jun. 19, 2017

(87) PCT Pub. No.: WO2016/102666
PCT Pub. Date: Jun. 30, 2016

(65) Prior Publication Data
US 2018/0002520 A1   Jan. 4, 2018

(30) Foreign Application Priority Data

Dec. 24, 2014 (FR) ..................... 14 63306

(51) Int. Cl.
| | | |
|---|---|---|
| *C08L 33/12* | (2006.01) | |
| *C08J 3/16* | (2006.01) | |
| *C08F 220/14* | (2006.01) | |
| *C08J 3/00* | (2006.01) | |
| *C08J 3/12* | (2006.01) | |

(52) U.S. Cl.
CPC ............ *C08L 33/12* (2013.01); *C08F 220/14* (2013.01); *C08J 3/005* (2013.01); *C08J 3/12* (2013.01); *C08J 3/16* (2013.01); *C08J 2333/12* (2013.01); *C08J 2433/10* (2013.01); *C08J 2463/02* (2013.01); *C08L 2207/53* (2013.01); *C08L 2310/00* (2013.01)

(58) Field of Classification Search
CPC combination set(s) only.
See application file for complete search history.

(56) References Cited

U.S. PATENT DOCUMENTS

| | | |
|---|---|---|
| 4,778,851 A | 10/1988 | Henton et al. |
| 6,043,293 A | 3/2000 | Belik et al. |
| 7,485,680 B2 | 2/2009 | Furukawa et al. |
| 8,217,098 B2 | 7/2012 | Ueno et al. |
| 2007/0027233 A1 | 2/2007 | Yamaguchi et al. |
| 2007/0191542 A1* | 8/2007 | Wakita .................. C08F 265/04 525/70 |
| 2009/0182080 A1* | 7/2009 | Kamata ................ C09D 11/107 524/361 |
| 2010/0099800 A1 | 4/2010 | Ueno et al. |
| 2011/0034612 A1 | 2/2011 | Lyons et al. |
| 2012/0142820 A1 | 6/2012 | Yamaguchi et al. |
| 2013/0289164 A1* | 10/2013 | Hilf ....................... C08F 220/10 523/172 |
| 2014/0206817 A1 | 7/2014 | Wakita et al. |
| 2014/0364541 A1 | 12/2014 | Lyons et al. |

FOREIGN PATENT DOCUMENTS

| | | | |
|---|---|---|---|
| EP | 1 724 299 A1 | 11/2006 | |
| FR | 2 934 866 | 8/2008 | |
| GB | 1117763 | 6/1968 | |
| JP | 2018180248 A * | 11/2018 | ............ B32B 27/30 |
| WO | WO 87/00188 | 1/1987 | |
| WO | Wo 2009/126373 A2 | 10/2009 | |

* cited by examiner

*Primary Examiner* — Robert S Jones
(74) *Attorney, Agent, or Firm* — Lynn B. Morreale (57) ABSTRACT

The present invention relates to a polymer composition comprising a (meth)acrylic polymer and a multistage polymer. In particular the present invention it relates to polymer composition comprising a (meth)acrylic polymer and a multistage polymer that can be used as a masterbatch. More particularly the present invention relates also to a process for preparing a polymer composition comprising a (meth) acrylic polymer and a multistage polymer by spray drying or coagulation.

26 Claims, 1 Drawing Sheet

US 10,513,603 B2

COMPOSITION COMPRISING A MULTISTAGE POLYMER, ITS METHOD OF PREPARATION AND ITS USE

CROSS-REFERENCE TO RELATED APPLICATIONS

This application claims priority under 35 U.S.C. § 371 of PCT/EP2015/081159, filed Dec. 23, 2015 which claims benefit to application FR14.63306, filed Dec. 24, 2014.

FIELD OF THE INVENTION

The present invention relates to a polymer composition comprising a (meth)acrylic polymer and a multistage polymer.

In particular the present invention it relates to polymer composition comprising a (meth)acrylic polymer and a multistage polymer that can be used as a masterbatch.

More particularly the present invention relates also to a process for preparing a polymer composition comprising a (meth)acrylic polymer and a multistage polymer by spray drying or coagulation.

Technical Problem

Thermoset polymers are most widely used as matrix material in composite materials. A thermoset polymer is an infusible, insoluble polymer network. One possibility to obtain a thermoset polymer is by curing reaction of a thermosetting resin, such as an epoxy resin, with a hardener or curing agent or a polyester resin.

Due to the high crosslinking density the material is provided with a high glass transition temperature, which yields to excellent thermomechanical properties of the material. However the impact strength properties of thermoset polymers are insufficient for numerous applications.

Usually a rubber material is added in order to increase the impact strength.

Such a rubber can be a multistage polymer in form of core shell particles, with at least one stage that is a rubber.

The multistage polymer in form of core shell particles is available as agglomerated dry powders, the latter are dispersed in the matrix in order to obtain a homogenous distribution. For certain thermosetting resins and especially epoxy resin it is very difficult or nearly impossible to disperse correctly these multistage polymer particles.

It exists also a complex technology to incorporate a multistage polymer in form of core shell particles without drying the multistage polymer after its synthesis process in an epoxy resin by progressively changing the continuous dispersion medium of the core shell particle from water to an organic solvent.

The objective of the present invention is to obtain polymer composition comprising a multistage polymer that can be easily dispersed in non cured resins as epoxy, polyester and (meth)acrylics.

An objective of the present invention is also to have an efficient and homogenous distribution of the multistage polymer in resins as epoxy, polyester and (meth)acrylics.

Another objective of the present invention is to avoid agglomerated multistage polymer particles in resins as epoxy, polyester and (meth)acrylics.

An additional objective of the present invention is toughening the thermoset of epoxy, polyester or (meth)acrylics resin or thermoplastic matrix due to a homogenous distribution of impact modifier in form of a multistage polymer.

Still another objective of the present invention is a process for manufacturing a polymer composition comprising a multistage polymer that can be easily dispersed in non cured epoxy, polyester or (meth)acrylics resin.

Still an additional objective is having a process for preparing polymer composition comprising a multistage polymer that can be easily dispersed in non cured epoxy, polyester or (meth)acrylics resin and having an efficient and homogenous distribution of the multistage polymer in the corresponding thermoset resins.

Still a further objective is the use of a polymer composition comprising a multistage polymer that is masterbatch for the impact modification of thermoset polymers including epoxy, polyester or (meth)acrylics resin.

Still another objective of the present invention is a process for manufacturing a polymer composition in form of a free flowing dry powder comprising a (meth)acrylic polymer and a multistage polymer for use as a masterbatch for the impact modification of thermoset epoxy, polyester or (meth)acrylics resin with a homogenous distribution of the multistage polymer.

BACKGROUND OF THE INVENTION

Prior Art

The document EP 0 228 450 discloses rubber modified epoxy compounds. The composition comprises a continuous epoxy resin phase and a discontinuous phase of rubber particles dispersed in the continuous phase. The rubber particles are grafted rubber particles. The rubber particles are dispersed in the epoxy phase with a mixing or shearing device.

The document EP 0 911 358 discloses the use of block-copolymers as impact modifiers in epoxy resin. However block copolymers are relatively expensive and it is preferred to disperse standard core-shell impact modifiers in the epoxy resin.

The document FR 2934866 (our AM 2509) discloses polymer preparation of a specific core shell polymers with functional shell comprising hydrophilic monomers. The core shell polymers are used as impact modifier in thermoset polymers.

The document EP 1 632 533 describes a process for producing modified epoxy resin. The epoxy resin composition is having rubber like polymer particles dispersed in it by a process that brings the particles in contact with an organic medium that disperses the rubber particles.

The document EP 1 666 519 discloses a process for producing rubbery polymer particles and process for resin composition containing the same.

The document EP 2 123 711 discloses a thermosetting resin composition having a rubbery polymer particle dispersed therein and process for production thereof.

None of the prior art documents discloses a composition as claimed or a process for obtaining it.

BRIEF DESCRIPTION OF THE INVENTION

Surprisingly it has been found that a polymer composition comprising
a) a (meth)acrylic polymer (P1), and
b) a multi stage polymer,
wherein the multi stage polymer makes up at least 20 wt % of the composition can easily dispersed in epoxy, polyester or (meth)acrylics resin.

Surprisingly it has also been found that a polymer composition comprising
- a) a (meth)acrylic polymer (P1), and
- b) a multi stage polymer, wherein the multi stage polymer makes up at least 20 wt % of the composition can be used as masterbatch for epoxy, polyester or (meth)acrylics resin.

Surprisingly it has also been found that a process for manufacturing a polymer composition comprising the steps of
- a) mixing of a (meth)acrylic polymer (P1) and a multi stage polymer
- b) recovering the obtained mixture of previous step wherein the (meth)acrylic polymer (P1) and the multi stage polymer in step a) are in form of a dispersion in aqueous phase yields to a polymer composition that can be used as masterbatch for epoxy, polyester or (meth)acrylics resin.

Surprisingly it has also been found that a polymer composition comprising
- a) a (meth)acrylic polymer (P1), and
- b) a polymer obtained by a multistage process with
  - a) one stage (A) comprising a polymer (A1) having a glass transition temperature of less than 0° C.
  - b) one stage (B) comprising a polymer (B1) having a glass transition temperature of at least 30° C., wherein polymer obtained by the multistage process makes up at least 20 wt % of the composition a)+b) can easily dispersed in epoxy, polyester or (meth)acrylics resin and can be used as masterbatch for epoxy, polyester or (meth)acrylics resin.

DETAILED DESCRIPTION OF THE INVENTION

According to a first aspect, the present invention relates to a polymer composition comprising
- a (meth)acrylic polymer (P1), and
- a multi stage polymer, wherein the multi stage polymer makes up at least 20 wt %, preferably at least 30 wt %, more preferably at least 40% and advantageously at least 50 wt % of the polymer composition.

According to a second aspect, the present invention relates to a polymer composition comprising
- a (meth)acrylic polymer (P1), and
- a multi stage polymer, said the multi stage polymer comprises
  - a) one stage (A) comprising a polymer (A1) having a glass transition temperature of less than 0° C.
  - b) one stage (B) comprising a polymer (B1) having a glass transition temperature of at least 30° C., wherein the multi stage polymer makes up at least 20 wt %, preferably at least 30 wt %, more preferably at least 40% and advantageously at least 50 wt % of the polymer composition.

In a third aspect the present invention relates to a process for manufacturing a polymer composition comprising the steps of
- a) mixing of a (meth)acrylic polymer (P1), and a multi stage polymer
- b) drying the obtained mixture of previous step wherein the a (meth)acrylic polymer (P1) and the multi stage polymer in step a) are in form of a dispersion in aqueous phase.

In a fourth aspect the present invention relates to the use of a polymer composition comprising
- a (meth)acrylic polymer (P1), and
- a multi stage polymer, wherein the multi stage polymer makes up at least 20 wt %, preferably at least 30 wt %, more preferably at least 40% and advantageously at least 50 wt % of the composition,
as masterbatch for epoxy, polyester or (meth)acrylics resin.

In a fifth aspect the present invention relates to a process for manufacturing a polymer composition comprising the steps of
- a) mixing of a (meth)acrylic polymer (P), and a multi stage polymer
- b) recovering the obtained mixture of previous step wherein the (meth)acrylic polymer (P1) and the multi stage polymer in step a) are in form of a dispersion in aqueous phase, for the use as masterbatch for epoxy, polyester or (meth)acrylics resin.

In a sixth aspect the present invention relates to a process for manufacturing a masterbatch polymer composition comprising the steps of
- a) mixing of a (meth)acrylic polymer (P1), and a multi stage polymer
- b) recovering the obtained mixture of previous step wherein the (meth)acrylic polymer (P1) and the multi stage polymer in step a) are in form of a dispersion in aqueous phase.

By the term "polymer powder" as used is denoted a polymer comprising powder grain in the range of at least 1 micrometer (µm) obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "epoxy resin" as used is understood any organic compound having at least two functional groups of oxirane type which can be polymerized by ring opening.

By the term "(meth)acrylic resin" as used is understood adhesives based on acrylic and methacrylic monomers.

By the term "masterbatch" as used is understood composition that comprises an additive in high concentration in a carrier material. The additive is dispersed in the carrier material.

The multistage polymer according to the invention has at least two stages that are different in its polymer composition.

The multistage polymer is preferably in form of polymer particles considered as spherical particles. These particles are also called core shell particles. The first stage forms the core, the second or all following stages the respective shells.

With regard to the spherical polymer particle, it has a weight average particle size between 20 nm and 800 nm. Preferably the weight average particle size of the polymer is between 25 nm and 600 nm, more preferably between 30 nm and 550 nm, still more preferably between 35 nm and 500 nm, advantageously between 40 nm and 400 nm, more advantageously between 50 nm and 350 nm and most advantageously between 80 nm and 300 nm.

The polymer particle has a multilayer structure comprising at least one layer (A) comprising a polymer (A1) having a glass transition temperature below 0° C. and another layer (B) comprising a polymer (B1) having a glass transition temperature over 60° C. Preferably the polymer (B1) having a glass transition temperature of at least 30° C. is the external layer of the polymer particle having the multilayer structure. Preferably the stage (A) is the first stage and the stage (B) comprising polymer (B1) is grafted on stage (A) comprising polymer (A1) or another intermediate layer.

The polymer particle is obtained by a multistage process such as a process comprising two, three or more stages.

The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure. Preferably the polymer (A1) is having a glass transition temperature below −5° C., more preferably below −15° C., advantageously below −25° C.

Preferably the polymer (B1) having a glass transition temperature over 60° C. is made in the last stage of the multistage process forming the external layer of the polymer particle having the multilayer structure.

There could be additional intermediate layer or layers obtained by an intermediate stage or intermediate stages The glass transition temperature Tg of the respective polymers can be estimated for example by dynamic methods as thermo mechanical analysis.

With regard to the polymer (A1), in a first embodiment it is a (meth)acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less then 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt % of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

In a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

In a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 70 wt % of monomer units coming from methyl methacrylate.

Preferably the glass transition temperature Tg of the polymer (B1) is between 30° C. and 150° C. The glass transition temperature of the polymer (B1) is more preferably between 50° C. and 150° C., still more preferably between 70° C. and 150° C., advantageously between 90° C. and 150° C. and more advantageously between 90° C. and 130° C.

With regard to the process for manufacturing the multistage polymer according to the invention it comprises the steps of a) polymerizing by emulsion polymerization of a monomer or monomer mixture ($A_m$) to obtain at least one layer (A) comprising polymer (A1) having a glass transition temperature of less then 0° C.

b) polymerizing by emulsion polymerization of a monomer or monomer mixture ($B_m$) to obtain layer (B) comprising a polymer (B1) having a glass transition temperature of at least 30° C.

the monomer or monomer mixture ($A_m$) and the monomer or monomer mixture ($B_m$) are chosen from monomers according to the composition for polymer (A1) and polymer (B1) given earlier.

Preferably the step a) is made before step b). More preferably step b) is performed in presence of the polymer (A1) obtained in step a), if there are only two stages.

Advantageously the process for for manufacturing the multistage polymer composition according to the invention is a multistep process comprises the steps one after the other of a) polymerizing by emulsion polymerization of a monomer or monomer mixture ($A_m$) to obtain one layer (A) comprising polymer (A1) having a glass transition temperature of less than 0° C.

b) polymerizing by emulsion polymerization of a monomer or monomer mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less then 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the (meth)acrylic polymer (P1), mention may be made of homopolymers and copolymers of (meth)acrylic monomers. Preferably the (meth)acrylic polymer (P1) comprises (meth)acrylic monomers that make up 50 wt % or more of the (meth)acrylic polymer (P1). More preferably the (meth)acrylic polymer (P1) comprises at least 60 wt % of (meth)acrylic monomers and advantageously at least 70 wt %.

Still more preferably the (meth)acrylic polymer (P1) comprises at least 70 wt % monomers chosen from C1 to C12 alkyl (meth)acrylates. Advantageously preferably the (meth)acrylic polymer (P1) comprises at least 80 wt % of monomers C1 to C4 alkyl methacrylate and/or C1 to C8 alkyl acrylate monomers.

In one preferred embodiment the (meth)acrylic polymer (P1) comprises from 80 wt % to 100 wt % methyl methacrylate, preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate or butyl acrylate.

In certain embodiments the (meth)acrylic polymer (P1) comprises also a functional comonomer.

The functional comonomer has the formula (1)

(1)

wherein $R_1$ is chosen from H or $CH_3$ and $R_2$ is H or an aliphatic or aromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol.

In a second preferred embodiment the (meth)acrylic polymer (P1) comprises between 0 wt % and 50 wt % of a functional monomer. Preferably the meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (2) or (3)

(2)

(3)

wherein in both formulas (2) and (3) $R_1$ is chosen from H or $CH_3$; and in formula (2) Y is O, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol Preferably the glass transition temperature Tg of the (meth)acrylic polymer (P1) of all embodiments is between 30° C. and 150° C. The glass transition temperature of the (meth)acrylic polymer (P1) is more preferably between 40° C. and 150° C., advantageously between 45° C. and 150° C. and more advantageously between 50° C. and 150° C.

Preferably the (meth)acrylic polymer (P1) of all embodiments is not crosslinked.

The (meth) acrylic polymer (P1) is preferably in form of spherical polymer particles. The spherical polymer particles of (meth) acrylic polymer (P1) have a weight average particle size between 20 nm and 800 nm. Preferably the weight average particle size of the polymer is between 30 nm and 400 nm, more preferably between 30 nm and 350 nm and advantageously between 35 nm and 200 nm.

Preferably the (meth) acrylic polymer (P1) of all embodiments has a mass average molecular weight Mw of less than 100 000 g/mol, preferably less than 90 000 g/mol, more preferably less than 80 000 g/mol, still more preferably less than 70 000 g/mol and advantageously less than 60 000 g/mol.

Preferably the (meth) acrylic polymer (P1) of all embodiments has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and still more advantageously above 7 000 g/mol and most advantageously above 10 000 g/mol.

Advantageously the mass average molecular weight Mw of the (meth) acrylic polymer (P1) of all embodiments is between 2 000 g/mol and 100 000 g/mol, preferable between 3 000 g/mol and 90 000 g/mol, more preferably between 4 000 g/mol and 70 000 g/mol, advantageously between 5000 g/mol and 60 000 g/mol, more advantageously between 7 000 g/mol and 60 000 g/mol and most advantageously between 10 000 g/mol and 60 000 g/mol.

Preferably the polymer composition of the invention comprising the (meth)acrylic polymer (P1), and the multi stage polymer comprises no solvents. By no solvents is meant that eventually present solvent make up less than 1 wt % of the composition. The monomers of the synthesis of the respective polymers are not considered as solvents. The residual monomers in the composition present less than 2 wt % of the composition.

Preferably the polymer composition according to the invention is dry. By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The composition according to the invention comprising the (meth) acrylic polymer (P1) and the multi stage polymer does not comprise any voluntary added solvent. Eventually residual monomer from the polymerization of the respective monomers and water are not considered as solvents.

With regard to the process for manufacturing the (meth) acrylic polymer (P1) according to the invention is comprises the step of polymerizing the respective (meth)acrylic monomers.

The (meth)acrylic homo or copolymer (P1) could be made in batch or semi-continuous process:
for the batch process, the mixture of monomers is introduced in one shot just before of after introduction of one or part of the initiator system
for the semi-continuous process, the monomer mixture is added in multiple shots or continuously in parallel to the initiator addition (the initiator is also added in multiple shots or continuously) during a defined period of addition which could be in the range 30 to 500 min.

With regard to the process for manufacturing the polymer composition according to the invention, it comprises the steps of
a) mixing of the (meth) acrylic polymer (P1) and the multi stage polymer
b) recovering the obtained mixture of previous step in form of a polymer powder
wherein the (meth) acrylic polymer (P1) and the multi stage polymer in step a) are in form of a dispersion in aqueous phase.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition according to the invention, is preferably made by coagulation or by spray drying.

The process for manufacturing the polymer composition according to the invention can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition according to the invention yields preferably to a polymer powder. The polymer powder of the invention is in form of particles. A polymer powder particle comprises agglomerated primary polymer particles made by multistage process and the (meth) acrylic polymer (P1).

With regard to the polymer powder of the invention, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 950 μm and preferably 500 μm, more preferably at most 400 μm.

The present invention relates also to the use of the polymer composition according to the invention in form of the polymer powder as masterbatch for thermosetting resins or thermoplastic polymers.

The master batch is blended with the other resin or polymer. The ratio of the master batch used is at most 90 wt % in view to the composition containing the thermosetting resin or thermoplastic polymers and the polymer composition according to the invention. The ratio of the master batch used is at least 10 wt % in view to the composition containing the thermosetting resin or thermoplastic polymers and the polymer composition according to the invention.

The present invention concerns as additional aspect an impact modified polymer composition.

With regard to the impact modified polymer composition according to the invention it comprises
 a) a polymer (P2) and
 b) a meth)acrylic polymer (P1) and
 c) a multi stage polymer,
characterized that the multistage polymer makes up at least 5 wt % of the composition.

Preferably the impact modified polymer polymer composition according to the invention it comprises
 a) a polymer (P2) and
 b) a (meth)acrylic polymer (P1), and
 c) a polymer obtained by a multistage process with
  one stage (A) comprising a polymer (A1) having a glass transition temperature of less then 0° C.
  one stage (B) comprising a polymer (B1) having a glass transition temperature of at least 30° C.,
characterized that the multistage polymer makes up at least 5 wt % of the composition.

The multistage polymer and the meth)acrylic polymer (P1) are the same as defined before.

The respective stages (A) and (B), respectively comprising the polymers (A1) and (B1) respectively and the characteristics of the respective polymers (A1) and (B1) are the same as defined before.

With regard to the polymer (P2), according to the invention it is a thermosetting resin R1 or a thermoplastic polymer.

The thermosetting resin R1 is preferably chosen from epoxy, polyester or (meth)acrylics resin.

With regard to the epoxy resin, according to the invention it can be any organic compound having at least two functional groups of oxirane type which can be polymerized by ring opening.

These epoxy resin (abbreviated E1) can be monomeric or polymeric, on the one hand, aliphatic, cycloaliphatic, heterocyclic or aromatic, on the other hand. Mention may be made, as examples of such epoxy resins, of resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl) methane, polyglycidyl ethers of phenol-formaldehyde novolak, poly-glycidyl ethers of ortho-cresol novolak and tetraglycidyl ethers of tetraphenyl-ethane. Mixtures of at least two of these resins can also be used.

In a first more preferred embodiment the impact modified polymer composition according to the invention comprises
 a) an epoxy resin E1 that has a Tg of 25° C. or less and
 b) a (meth)acrylic polymer (P1) comprising from 80 wt % to 100 wt % methyl methacrylate, and
 c) a polymer obtained by a multistage process with
  one stage (A) comprising a polymer (A1) having a glass transition temperature of less then 0° C.
  one stage (B) comprising a polymer (B1) having a glass transition temperature of at least 30° C.,
characterized that the multistage polymer makes up at least 5 wt % of the composition.

In a second more preferred embodiment the impact modified polymer composition according to the invention comprises
 a) an epoxy resin E1 and
 b) a (meth)acrylic polymer (P1) comprising functional comonomer, and
 c) a polymer obtained by a multistage process with
  one stage (A) comprising a polymer (A1) having a glass transition temperature of less then 0° C.
  one stage (B) comprising a polymer (B1) having a glass transition temperature of at least 30° C.,
characterized that the multistage polymer makes up at least 5 wt % of the composition.

Preferably the epoxy resin E1 is a chosen from resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl) methane, polyglycidyl ethers of phenol-formaldehyde novolak, poly-glycidyl ethers of ortho-cresol novolak and tetraglycidyl ethers of tetraphenyl-ethane.

The impact modified polymer composition according to the invention comprises between 1% and 90% of polymer obtained by the multistage process.

With regard to the process for manufacturing the impact modified polymer composition according to the invention, it comprises the step of
a) mixing epoxy rein E1 with a masterbatch
said master batch is a polymer composition comprising a (meth)acrylic polymer (P1) and a multistage polymer.

The multistage polymer and the (meth)acrylic polymer (P1) are the same as defined before.

The epoxy resin comprising polymer composition can be cured.

In a third more preferred embodiment the the impact modified polymer composition according to the invention comprises
 a) a methacrylic resin and
 b) a (meth)acrylic polymer (P1) comprising from 80 wt % to 100 wt % methyl methacrylate, and
 c) a polymer obtained by a multistage process with
  one stage (A) comprising a polymer (A1) having a glass transition temperature of less than 0° C.
  one stage (B) comprising a polymer (B1) having a glass transition temperature of at least 30° C.,
characterized that the multistage polymer makes up at least 5 wt % of the composition.

The impact modified polymer composition comprising the methacrylic resin is preferably an adhesive composition.

[Methods of Evaluation]

AFM Atomic Force Microscopy (AFM) is performed with D3100 from the company VEECO in tapping mode. Two modes are used for acquiring images: height mode for obtaining the topography of the surface and phase contrast mode for obtaining the viscoelastic properties.

For the AFM the sample is broken and for obtaining a thin more or less smooth surface the sample is cooled down to −90° C. and cut with a microtome. The cut slices of the sample have a thickness of about 100 nm.

Molecular Weight:

The mass average molecular weight (Mw) of the polymers is measured with by size exclusion chromatography (SEC).

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The used frequency is 1 Hz. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Particle Size Analysis:

The particle size of the primary particles after the multistage polymerization is measured with a Zetasizer Nano S90 from MALVERN. The particle size of the polymer powder is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 μm is used.

EXAMPLES

Comparative Example 1

Synthesis of Multistage Polymer (Core-Shell Particles)
First Stage—Polymerization of Core:

To a 20 litres high pressure reactor was charged: de-ionized water 116.5 parts, emulsifier potassium salt of beef tallow fatty acid 0.1 part, 1,3-butadiene (BD) 21.9 parts, t-dodecyl mercaptan 0.1 parts, and p20 menthane hydroperoxide 0.1 parts as an initial kettle charge. The solution was heated, with agitation, to 43° C. at which time a redox-based catalyst solution was charged (water 4.5 parts, sodium tetrapyrophosphate 0.3 parts, ferrous sulphate 0.004 parts and dextrose 0.3 parts), effectively initiating the polymerization. Then the solution was further heated to 56° C. and held at this temperature for a period of three hours. Three hours after polymerization initiation, a second monomer charge (77.8 parts BD, t-dodecyl mercaptan 0.2 parts), one-half of an additional emulsifier and reductant charge (de-ionized water 30.4 parts, emulsifier potassium salt of beef tallow fatty acid 2.8 parts, dextrose 0.5 parts) and additional initiator (p-menthanehydroperoxide 0.8 parts) were continuously added over eight hours. Following the completion of the second monomer addition, the remaining emulsifier and reductant charge plus initiator was continuously added over an additional five hours. Thirteen hours after polymerization initiation, the solution was heated to 68° C. and allowed to react until at least twenty hours had elapsed since polymerization initiation, producing polybutadiene rubber latex, R1. The resultant polybutadiene rubber latex (R1) contained 38% solids and had a weight average particle size of about 160 nm.

Second Stage—Polymerization of Shell 1 (Outer Shell):

into a 3.9 litres reactor was charged 75.0 parts, on a solids basis, of polybutadiene rubber latex R1, 37.6 parts de-ionized water, and 0.1 parts sodium formaldehyde sulfoxylate. The solution was agitated, purged with nitrogen, and heated to 77° C. When the solution reached 77° C., a mixture of 22.6 parts methyl methacrylate, 1.4 parts divinyl benzene and 0.1 parts t-butyl hydroperoxide initiator was continuously added over 70 minutes, followed by o hold period of 80 minutes. Thirty minutes after the onset of the hold period, 0.1 parts of sodium formaldehyde sulfoxylate and 0.1 parts t-butyl hydroperoxide were added to the reactor at once. Following the 80-minute hold period, a stabilization emulsion was added to the graft copolymer latex. The stabilization emulsion was prepared by mixing 3.2 parts de-ionized water (based on graft copolymer mass), 0.1 parts oleic acid, 0.1 arts potassium hydroxyde, and 0.9 parts octadecyl-3-(3, 5-di20 tertbutyl-4-hydroxyphenyl)propionate. The resultant core shell latex (multistage polymer MP1) had a weight average particle size of about 180 nm and a solid content of 38%.

Coagulation:

In a jacketed vessel of 3 L, equipped with a stirrer is put successively 500 g of latex of core-shell particles (multistage polymer MP1) for having a solid content of 14.1%. Under stirring at 300 r/min, the heat of the solution is raised at 52° C. and then is injected a 1.6% aqueous sulphuric acid solution resulting in a coagulated material that is heat treated at 96° C. The pH was adjusted with NaOH during the coagulation between 2 and 6. Subsequently, the coagulated material is filtered on centrifuge and washed with de-ionized water. After filtration and drying a powder with less than 1% of residual volatiles is obtained.

This powder (at 20% ratio) is dissolved at ambient temperature in a DGEBA epoxy resin. Then the hardener component (Jeffamine) is added and mixed (in order to have the coagulated material at 10% in the final resin) and cured at 120° C. during 2 hours.

Figure 1:
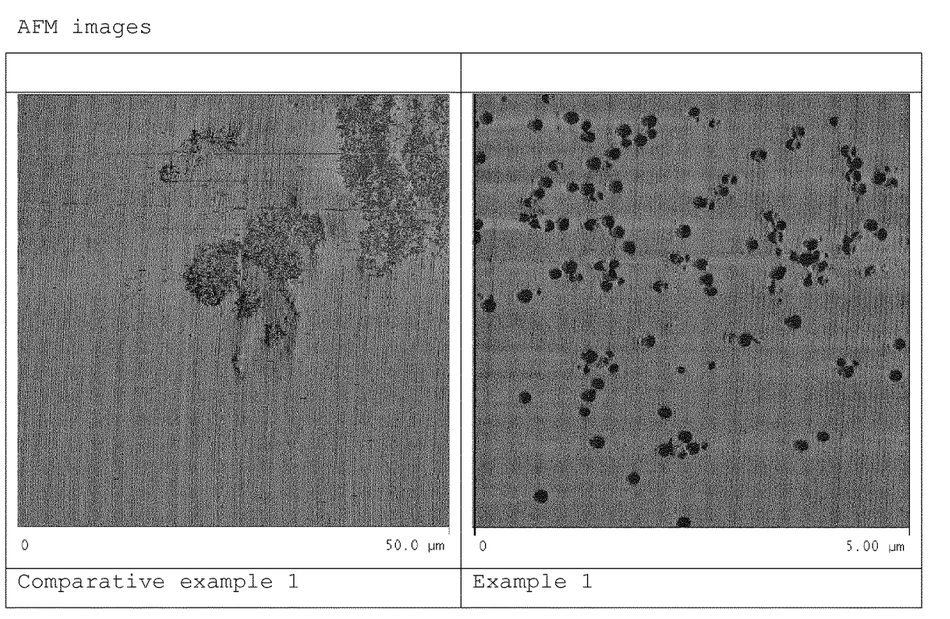

The dispersion of the additive is observed with an AFM equipment, the dispersion is not good and aggregate of particles can be observed (see AFM picture in FIG. 1).

Example 1

The same multistage polymer MP1 is prepared as in comparative example 1.

Synthesis of the copolymer P1: semi continuous process: charged into a reactor, with stirring, were 1700 g of de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution. Three vacuum-nitrogen purges were carried out in succession and the reactor left under a slight vacuum. The reactor was then heated. At the same time, a mixture comprising 960.03 g of methyl methacrylate, 106.67 g of dimethylacrylamide and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and he polymerization was then left to completion for 60 minutes after the end of the monomers addition. The reactor was cooled down to 30° C. The obtained solid content is 34.2%. The mass average molecular weight of the copolymer P1 is $M_w$=28 000 g/mol.

Coagulation:

A mixture of 139.14 g of multistage polymer MP1 latex and 51.54 g of copolymer P1 latex is diluted with 309.32 g of de-ionized water to obtain 500 g of a latex mixture with a 14.1% solid content. In a jacketed vessel of 3 L, equipped with a stirrer is put the 500 g of the prepared mixture latex. Under stirring at 300 r/min, the heat of the solution is raised at 52° C. and then is injected a 1.6% aqueous sulphuric acid solution resulting in a coagulated material that is heat treated at 96° C. The pH was adjusted with NaOH during the coagulation between 2 and 6. Subsequently, the coagulated material is filtered on centrifuge and washed with de-ionized water. After filtration and drying a powder with less than 1% of residual volatiles is obtained.

This powder (at 20% ratio) is dissolved at ambient temperature in a DGEBA epoxy resin. Then the hardener component (Jeffamine) is added and mixed (in order to have the coagulated material at 10% in the final resin) and cured at 120° C. during 2 hours.

The dispersion of the additive is observed with an AFM equipment, the dispersion is very good and well dispersed particles can be observed see picture.

The invention claimed is:

1. A polymer powder composition comprising:
   (meth) acrylic polymer (P1) comprising at least 70 wt % monomers selected from the group consisting of C1 to C12 alkyl (meth)acrylates and having a mass average molecular weight MW of less than 80,000 g/mol and a glass transition temperature Tg between 30° C. and 150° C., and
   a multi stage core shell polymer,
   wherein the multistage polymer makes up at least 20 wt % of the polymer composition.

2. The polymer composition according to claim 1, wherein (meth) acrylic polymer (P1) has a mass average molecular weight Mw of less than 60,000 g/mol.

3. The polymer composition according to claim 1, wherein (meth) acrylic polymer (P1) has a mass average molecular weight Mw between 5000 g/mol and 60,000 g/mol.

4. The polymer composition according to claim 1 wherein the composition comprises at least 30% of multistage polymer.

5. The polymer composition according to claim 1 wherein the multi stage core shell polymer comprises:
   a) one stage (A) comprising a polymer (A1) having a glass transition temperature of less than 10° C., and
   b) one stage (B) comprising a polymer (B1) having a glass transition temperature of at least 30° C.

6. The polymer composition according to claim 5, wherein stage (A) is the first stage and wherein stage (B) comprising polymer (B1) is grafted on stage (A) comprising polymer (A1).

7. The polymer composition according to claim 5 wherein polymers (A1) and (B1) are acrylic or methacrylic polymers.

8. The polymer composition according to claim 5 wherein polymer (A1) comprises at least 50 wt % of polymeric units coming from isoprene or butadiene.

9. The polymer composition according to claim 5 wherein polymer (A1) is a silicone rubber based polymer.

10. The polymer composition according to claim 1 wherein (meth) acrylic polymer (P1) comprises from 80 wt % to 100 wt % methyl methacrylate and from 0.2 wt % to 20 wt % of C1 to C8 alkyl acrylate monomer.

11. The polymer composition according to claim 1 wherein (meth) acrylic polymer (P1) further comprises a functional comonomer.

12. The polymer composition according to claim 1 wherein (meth) acrylic polymer (P1) comprises between 0 wt % and 50 wt % of a functional monomer.

13. The polymer composition according to claim 11 wherein the functional comonomer is selected from the group consisting of glycidyl (meth)acrylate, acrylic and methacrylic acid, the amides derived from these acids, dimethylacrylamide, 2-methoxyethyl acrylate and methacrylate, 2-aminoethyl acrylates and methacrylates optionally quaternized, acrylate and methacrylate monomers comprising a phosphonate group, acrylate and methacrylate monomers comprising a phosphate group, alkyl imidazolidinone (meth) acrylates, and polyethylene glycol (meth) acrylates.

14. A process for manufacturing the polymer powder composition of claim 1 comprising the steps of:
   a) mixing said (meth) acrylic polymer (P1) and said multi stage core shell polymer to form a mixture,
   b) recovering the mixture of step (a) in the form of a polymer powder,
   wherein the (meth) acrylic polymer (P1) and the multi stage core shell polymer in step a) are in form of a dispersion in aqueous phase.

15. The process according to claim 14, wherein (meth) acrylic polymer (P1) has a mass average molecular weight Mw of less than 60,000 g/mol.

16. The process according to claim 14, wherein (meth) acrylic polymer (P1) has a mass average molecular weight Mw between 5000 g/mol and 60,000 g/mol.

17. The process according to claim 14 wherein the multistage core shell polymer makes up at least 20 wt % of the polymer powder composition which is dry.

18. The process according to claim 14 wherein step a) is made before step b).

19. The process according to claim 14 wherein recovering step b) is made by coagulation or by spray drying.

20. An impact modified polymer composition comprising
   a) a polymer (P2),
   b) a (meth)acrylic polymer (P1) which is a powder and comprises at least 70 wt % monomers selected from the group consisting of C1 to C12 alkyl (meth)acrylates and having a mass average molecular weight MW of less than 80,000 g/mol and a glass transition temperature Tg between 30° C. and 150° C., and
   c) a multistage core shell polymer obtained by a multistage process with
      one stage (A) comprising polymer (A1) having a glass transition temperature of less than 0° C., and
      one stage (B) comprising polymer (B1) having a glass transition temperature of at least 30° C.,
   whereby the multistage polymer makes up at least 5 wt % of the composition.

21. The impact modified polymer composition according to claim 20 wherein (meth) acrylic polymer (P1) has a mass average molecular weight Mw between 5000 g/mol and 60,000 g/mol.

22. The impact modified polymer composition according to claim 20 wherein polymer (P2) is thermosetting resin R1 selected from the group consisting of epoxy, polyester and (meth)acrylics resin.

23. The impact modified polymer composition according to claim 20 wherein polymer (P2) is thermosetting resin R1 that is an epoxy resin E1 having a Tg of 25° C. or less and wherein (meth)acrylic polymer (P1) comprises from 80 wt % to 100 wt % methyl methacrylate.

24. The impact modified polymer composition according to claim 20 wherein polymer (P2) is thermosetting resin R1 that is an epoxy resin E1 and the (meth)acrylic polymer (P1) comprises functional comonomer.

25. The impact modified polymer composition according to claim 20 wherein polymer (P2) is a methacrylic resin and wherein (meth)acrylic polymer (P1) comprises from 80 wt % to 100 wt % methyl methacrylate.

26. The polymer powder composition of claim 1 which comprises substantially no solvents, including no voluntarily added solvents.

* * * * *